United States Patent Office 2,795,535
Patented June 11, 1957

2,795,535
CONTACT FILTRATION OF LUBRICATING OILS

Gifford W. Crosby, River Forest, Le Roy W. Holm, Crystal Lake, Robert W. Morrison, Northfield, and Walter J. Sandner, Carpentersville, Ill., assignors to The Pure Oil Company, Chicago, Ill., a corporation of Ohio No Drawing. Application December 30, 1952,
Serial No. 328,798

7 Claims. (Cl. 196—147)

This invention relates to a clay contacting process for treating lubricating oil base stocks and is directly concerned with improving the neutralization number of unused, non-additive type lubricating oil stocks.

Refining by adsorption has long been employed as a unit process by refiners of petroleum products. There are available two different types of processes employing adsorption, namely, vapor phase refining and liquid phase treating. Vapor phase treatment generally has application in the refining of relatively light petroleum distillates, especially cracked gasolines, to improve color and odor and reduce the gum content. Heavier petroleum products such as lubricating oil stocks, however, are generally treated in the liquid phase by either passing the oils through a column of granular adsorbents or by mixing the oils in the liquid state with finely divided solid adsorbents at an elevated temperature and then filtering the mixture after treatment to recover an improved lubricating oil stock. The former method is known as percolation and the second method is known as contact filtration. Because, in general, contact filtration methods are more economical than percolation type processes, this method is generally used as one processing stage in the manufacture of lubricating oils and it is with this type of process that the instant invention is specifically concerned. Contact filtration processes also permit greater flexibility in operating conditions, particularly temperature, as well as in changing feed stocks.

In contact filtration the lubricating oil stock is mixed with a finely divided adsorbent. This mixture is then heated to an elevated temperature. In plant operations the commingling of the adsorbent and the oil is accomplished by mechanical agitation in a contacting vessel wherein the contacting is carried out at a temperature between about 220 to 650° F. Where the heavier stocks are treated, the higher temperatures of this temperature range are employed. However, various modifications in the general method of procedure may be employed.

Clay is generally used as the adsorbent in refining by contact filtration although other types of solid adsorbents such as silica gel, bauxite, magnesol and the like, may be employed. These clays, which consist of hydrous alumino silicates, are either of mineral origin and are used either as found in nature in their natural state or after treatment with acid to enhance their adsorptive properties or may be prepared synthetically. Many of these clays are sold under trade names such as Filtrol, Attapulgus, etc. Although contact filtration processes have been used in general to clarify and decolorize lubricating oils, they are not successfully employed in all instances to neutralize lubricating oils that have been acid treated, solvent extracted or simply distilled. The adsorbents will readily remove the stronger acidic substances such as sulfuric acid and other mineral acids from the oils. However, it is well known that even though organic acids can be removed from lubricating oils, the use of contact filtration is not resorted to in these instances because this class of oxygenated compounds can not be removed economically. A manipulative technique, however, has been discovered which will permit the use of contact filtration processes to substantially reduce the amounts of the weaker inorganic acids present either alone or in combination with the stronger mineral acids in mineral lubricating oils.

As an indication of the amounts of acidic constituents present in the oil, a neutralization value is assigned to the oil after subjecting a sample of the oil to the scrutiny of a carefully prescribed procedure. In this test, which is given the A. S. T. M. Designation D974–51T and is fully described in the A. S. T. M. Standards on Petroleum Products—1951 published by the American Society for Testing Material, the acidic constituents are neutralized with a caustic alkali, potassium hydroxide. Neutralization value is generally included in specifications for most mineral lubricating oils for the purposes of detecting trace amounts of corrosive acidic substances in the oils and as a refinery control to assure uniformity of composition and characteristics among successive batches of refined mineral oils. Generally a neutralization value of not greater than 0.1 is specified as a maximum permissible value for lubricating oil stocks.

Accordingly it is the object of this invention to provide a contact filtration process for treating lubricating oils to substantially reduce the neutralization value of the mineral oils containing acidic organic constituents.

According to this invention it has been found that by carrying out the contact filtration process with a finely divided solid adsorbent such as clay, bauxite, silica gel, magnesol and the like, that is free from adsorbed water at the temperature at which the contacting is effected, a maximum neutralization value reduction can be effected. It is well known in the prior art that the presence of water in clays as well as other types of solid adsorbents affects the activity of these adsorbents and that too little or too much moisture also has an inimical effect on the efficiency of the clay. Therefore the prior art has found that in order to treat lubricating oils or other heavy petroleum products, such as vasolines and waxes, to decolorize and clarify them, it is necessary that the solid adsorbents employed as contacting agents be treated to remove a substantial portion of the water adsorbed in the clay. Therefore it has been the practice in preparing clays for use to dry them to a controlled moisture content. It is pointed out in the prior art that the tolerable water content of clays may vary between 5 and 20 percent by weight of moisture. It has been found, however, that when commercially available clays having a water content between these ranges are employed to reduce the neutralization number of a lubricating oil, the clay adsorbent is ineffectual in this application. In order to successfully employ a contact filtration process to neutralize lubricating oils containing organic acid constituents, it is essential to the instant invention that the contacting process be carried out with a solid adsorbent which is substantially free from physically bound water. This water is adsorbed water which is defined as the physically combined or adsorbed moisture which may be removed from the clay by calcining the adsorbent at temperatures below 400 to 500° F. or at the contacting temperature employed in effecting a reduction in the neutralization value.

To demonstrate the effect of adsorbed water on acid removal in contact filtration, several experiments were conducted with adsorbents having a variety of adsorbed water contents, the variations in moisture control being produced by employing several different processing techniques. High gas stripping rates, contacting under vacuum, or a combination of gas stripping and vacuum which removed the adsorbed water quickly were employed and as a further alternative, predried clay was employed to effect a maximum removal of adsorbed water. The equilibrium moisture content attained by using steam stripping during the contacting step was used to produce an intermediate moisture content. An intermediate moisture content was also obtained by not using any external stripping under atmospheric pressure in an air-free atmosphere. High moisture content was provided by carrying out the clay contacting in a sealed bomb or in a conventional contacting apparatus which was equipped to reflux the effluent produced during the contacting operation. In either of these procedures substantially all of the moisture was retained therein. This experimental work was carried out with conventional laboratory equipment. The contacting apparatus consisted of a flask fitted with a thermometer, mechanical stirrer, vent and gas inlet tube. 300 to 400 milliliters of a substantially water-free lubricating oil stock and a prescribed amount of the clay adsorbent were admixed in the flask to form an oil-adsorbent slurry. The mixture was heated to 400° F. for neutral stocks or 510° F. for bright stocks and constantly agitated during the course of the treatment which was completed in 10 to 35 minutes. After treating, the mixture was allowed to cool slightly to about 50° F. below the contacting temperature and was then filtered to recover a finished oil. The neutralization value of this oil, as well as the neutralization value of all finished samples, was obtained by means of the aforementioned procedure established by the American Society of Testing Materials. When nitrogen, carbon dioxide or methane were employed as a representative example of an inert, desiccated, gaseous stripping medium during the contacting, the flow rates were measured by suitable metering means. In the cases where the moisture content of the oil-adsorbent mixtures was measured, the effluent gases from the contact flask were passed through a moisture trap maintained at a low temperature by means of Dry Ice. In this trap the moisture was cooled in a graduated receiver. To avoid the deleterious effects of oxidation during the heating of the adsorbent-oil slurry, the preheating was carried out under an inert gaseous blanket to insure that air was not in contact with the heated mixture. In the cases where subatmospheric pressures were used, a vacuum was pulled through the vent line with the gas inlet tube closed. When both subatmospheric pressures and gas stripping were employed, the gas inlet tube was opened to a supply of the gas employed. The bomb experiments which were employed to insure complete water retention during the contacting were carried out by introducing 100 milliliters of lubricating oil stock along with the prescribed amount of clay into a glass-lined bomb which previously had been purged with nitrogen. The adsorbent oil was heated to 500° F. and held at this temperature for 30 minutes. During this time the bomb was constantly shaken to insure contacting of the oil and adsorbent. After cooling, the oil slurry was filtered and the finished oil recovered. Several types of naturally occurring clay were employed in the experiments, e. g., an acid-treated clay which had a 16.6% moisture content and an untreated clay which had a 14.3% moisture content, the moisture content being determined by heating the samples for 30 minutes in a muffle furnace at 1800° F. This moisture content includes both the structural water and adsorbed water. In the experiments in which the maximum acid value was attained, the moisture content of the clay adsorbent was reduced to the point that substantially the only water remaining in the clay was structural water. This removal of the adsorbed water was brought about by one of several techniques, viz:

(1) Stripping of the oil-adsorbent mixture during the contact period with sufficient amounts of an inert, desiccated gaseous medium such as nitrogen, carbon dioxide or methane, (2) Carrying out the contacting of the adsorbent-oil slurry at subatmospheric pressures sufficiently low to effect this end, (3) Combining the techniques in 1 and 2 above, (4) Pretreating the clay adsorbent at an elevated temperature to remove the adsorbed water prior to using the clay as a contacting agent, or (5) Carrying out the contacting of the adsorbent-oil slurry in the presence of steam stripping and thereafter stripping the resultant slurry prior to filtering with an inert, desiccated gaseous medium such as nitrogen, natural gas, etc.

As a precautionary measure when resorting to the pretreating technique wherein the clay is treated at an elevated temperature prior to use to remove the adsorbed moisture, in order to prevent a depreciation in efficiency of the acid treated types of clay, these substances should be vacuum-dried at about 250° F. to remove all of the adsorbed water from the clay. If these clays are heated at higher temperatures of about 500° F., the efficiency of the clay might be reduced. This difference might be explained by the fact that acid-treated clays might have traces of the treating acid remaining on the clay to cause a deleterious effect in treating efficiency. This however is only a surmisal and is not to be construed as a limiting factor of the instant invention. The results of the various experiments in which an acid-treated clay was used as the adsorbent are reported in Table I.

TABLE I

*Contacting dewaxed bright stock with acid-treated natural clay*

| Run No. | Clay Rate, #/bbl. | Stripping Conditions | | Contact Time, Min. | Moisture Loss, Percent of Orig. Clay | | Neutralization Value | Remarks |
|---|---|---|---|---|---|---|---|---|
| | | Gas | Rate, Liter/ Batch | | Pre-drying of Clay | During Contacting | | |
| 1 | | | | | | | 0.19 | Untreated oil. |
| 2 | 20 | Nitrogen | 6.0 | 30 | 0 | 10.5 | 0.03 | |
| 3 | 20 | ...do | 4.2 | 10 | 0 | 11.6 | 0.03 | |
| 4 | 20 | ...do | 6.0 | 30 | 10.5 | <1 | 0.03 | Clay pre-dried under vacuum to 190° F. |
| 5 | 20 | None | | 30 | 0 | 12.8 | 0.02 | Vacuum contacting at 15 mm. pressure. |
| 6 | 20 | Nitrogen | 1.5 | 30 | 10.5 | <1 | 0.07 | Clay oven-dried at 500° F. |
| 7 | 20 | ...do | 7.5 | 30 | 0 | 11.6 | 0.02 | Steam stripping of previously nitrogen stripped mixture. |
| | 20 | Steam | 5.1 | 30 | 0 | | 0.02 | |
| 8 | 20 | Nitrogen | 2.0 | 10 | 0 | 9.9 | 0.05 | |
| 9 | 20 | ...do | 1.1 | 10 | 0 | 9.9 | 0.06 | |
| 10 | 20 | ...do | 0.6 | 10 | 0 | 8.1 | 0.06 | |
| 11 | 20 | ...do | 0.3 | 10 | 0 | 7.6 | 0.09 | |
| 12 | 20 | Steam | >5 | 30 | 0 | *7.5 | 0.09 | *Estimated by difference; does not include moisture added as stripping steam-N₂ stripping of previously steam stripped mixture. |
| | | Nitrogen | 6.0 | 30 | 0 | >2.5 | 0.03 | |
| 13 | 20 | ...do | 2.2 | 30 | 7.5 | >1 | 0.07 | Vacuum dried clay. Moisture largely retained by refluxing. |
| 14 | 20 | ...do | 1.5 | 30 | 0 | | 0.09 | Moisture retained by refluxing. |
| 15 | 20 | ...do | 6.0 | 30 | 12.1 | 0 | 0.07 | Vacuum dried clay (clay pre-dried under vacuum to 190° F.) heated for 1 hour at 500° F. under nitrogen. Cf. run No. 4. |

TABLE II
Contacting dewaxed bright stock with natural clay

| Run No. | Clay Rate, #/bbl. | Stripping Conditions | | Contact Time, Min. | Moisture Loss, Percent of Orig. Clay | | Neutralization Value | Remarks |
| --- | --- | --- | --- | --- | --- | --- | --- | --- |
| | | Gas | Rate, Liter/Batch | | During Pre-drying | During Contacting | | |
| 1 | | | | | | | 0.19 | |
| 2 | 10 | Nitrogen | 4.0 | 10 | 0 | 10.4 | 0.07 | |
| 3 | 10 | ...do | 1.5 | 10 | 0 | 10.4 | 0.08 | |
| 4 | 10 | ...do | 2.0 | 10 | *8.7 | <2 | 0.08 | *Vacuum dried to 250° F. |
| 5 | 10 | ...do | 2.0 | 10 | *9.4 | <1 | 0.09 | *Oven-dried at 500° F. |
| 6 | 10 | ...do | 0.5 | 10 | 0 | 7.0 | 0.09 | |
| 7 | 10 | ...do | 6.0 | 30 | 0 | (10.4) | 0.07 | |
| | 10 | Steam | >5 | 30 | 0 | | 0.09 | Steam stripping of previously nitrogen-stripped mixture. |
| 8 | 10 | Nitrogen | 0.5 | 30 | 5.5 | <2 | 0.10 | |
| 9 | 10 | Steam | >5 | 30 | 0 | *5.8 | 0.13 | *Estimated by difference; does not include moisture added as stripping steam-N₂ stripping of previously steam-stripped mixture. |
| | 10 | Nitrogen | 6.0 | 30 | 0 | 4.6 | 0.07 | |
| 10 | 10 | ...do | 1.5 | 30 | 0 | low | 0.12 | Moisture largely retained by refluxing. |
| 11 | 10 | ...do | 0 | 30 | 0 | 0 | 0.16 | Treated in sealed bomb after nitrogen purging. |
| 12 | 10 | ...do | 0 | 30 | *9.4 | 0 | 0.11 | *Oven-dried at 500° F. Treated in sealed bomb after nitrogen purging. |

Table II contains a tabular summary of a similar set of experiments in which a naturally occurring clay was used as the adsorbent. It will be noted from this experimental data that in the contact filtration treatment of lubricating oil stocks the most effective acid removal was brought about only when the adsorbent-oil slurry had been dehydrated to remove substantially all of the adsorbed moisture which normally would be retained on the adsorbent at the temperature of contacting. In the instant study this amounted to about 12 percent by weight of the acid-treated clay which had 16.6 percent by weight total moisture and 10 percent of the natural clay which had 14.3 percent total moisture. It is obvious that in the event that adsorbents having a higher moisture content were employed, larger amounts of adsorbed water would have to be removed to provide a maximum reduction in acid value. It will be noted that equivalent results were obtained whether the substantially complete removal of adsorbed water was obtained by either stripping with sufficient amounts of an inert, desiccated gaseous medium such as nitrogen, carrying out the contacting at subatmospheric pressures, sufficiently low to effect the complete removal, or employing a clay adsorbent which had previously been heated to remove substantially all of the adsorbed water. It is also seen that, by permitting more moisture to remain in the contact mixture, the reduction in acid value became progressively less. For example, where the moisture remaining in the adsorbent-oil slurry was equal to about 40 percent by weight of the adsorbed water originally present in the adsorbent, the acid values of the finished oils were 0.06 to 0.07 higher than those obtained by treating the oil under conditions in which substantially all of the adsorbed water had been removed from the adsorbent. In those experiments in which various other intermediate adsorbed water contents were provided, the effectiveness of the treating process for reducing the neutralization value was correspondingly limited.

To further illustrate the instant invention additional experiments, the results of which are tabularly summarized in Tables III, IV, V and VI, were conducted to demonstrate the critical feature of the instant invention, viz., conducting the contacting for a time sufficient to remove from the solid adsorbent all of the adsorbed water at the contacting temperature. Although the prior art discloses similar manipulative techniques in conducting contacting processes to effect decolorization of lubricating oil stocks, the prior art workers have failed to recognize the essential feature of removing substantially all the adsorbed water from the adsorbent where reduction in neutralization value is an important objective in the finishing of lubricating oil stocks.

Table III contains the results of experiments using an acid-treated clay in the contacting of a dewaxed bright

TABLE III
Contacting dewaxed bright stock with acid-treated clay—Variation in contact time

| Run No. | Clay Rate, #/bbl. | Percent Moisture in Clay | Contact Temp., °F. | Contact Time, Min. | Vacuum in Hg | Charge Oil | | Treated Oil | |
| --- | --- | --- | --- | --- | --- | --- | --- | --- | --- |
| | | | | | | Neut. Value | Color | Neut. Value | Color |
| 1 | 10 | 23.3 | 510 | 1 | 26 | 0.19 | 7+ | 0.14 | −5 |
| 2 | 10 | 23.3 | 510 | 6 | 26 | 0.19 | 7+ | 0.12 | 5 |
| 3 | 10 | 23.3 | 510 | 11 | 26 | 0.19 | 7+ | 0.10 | +5 |
| 4 | 10 | 23.3 | 505 | 35 | 27 | 0.19 | 7+ | 0.07 | +5 |

TABLE IV
Contacting dewaxed bright stock with acid-treated clay—Variation in stripping medium

| Run No. | Clay Rate, #/bbl. | Percent Moisture in Clay | Contact Temp., °F. | Contact Time, Min. | Stripping Medium | | Pressure, Atm. | Charge oil | | Treated oil | |
| --- | --- | --- | --- | --- | --- | --- | --- | --- | --- | --- | --- |
| | | | | | Type | Rate | | Neut. Value | Color | Neut. Value | Color |
| 1 | 15 | 23.3 | 510 | 35 | Steam | 47#/bbl. | 1 | 0.19 | 4+ (dil.) | 0.10 | +5 |
| 2 | 15 | 23.3 | 512 | 35 | CO₂ | 120 cu. ft./bbl. | 1 | 0.19 | 4+ (dil.) | 0.03 | +5 |
| 3 | 15 | 23.3 | 513 | 35 | None | | 1 | 0.19 | 4+ (dil.) | 0.10 | 5 | stock in which the time of contact was varied. It was found that the time required for essentially maximum color improvement was insufficient for maximum reduction in neutralization value. Most efficient use of clay for decolorization purposes does not require the removal of adsorbed moisture. This is further illustrated in Table IV where the use of steam in the contacting operation does not allow the removal of sufficient moisture to give maximum reduction in neutralization value but does allow maximum improvement in color of the finished oil.

Table V presents data on the contacting of dewaxed bright stock with an acid-treated clay in which methane stripping, vacuum and combinations thereof were employed. At very low gas stripping rates or at intermediate vacuum, maximum reduction in neutralization value was not achieved while good decolorization was. In the light of experiments in which the moisture removal from the contact mixtures was measured, this is interpreted as the result of failure to remove enough of the adsorbed moisture. Increased gas stripping rates, increased vacuum or combinations thereof were found to produce greater reduction in neutralization value of the finished oil, without further improvement in color, which demonstrates the critical features of the instant invention.

Table VI illustrates the improvement in neutralization value reduction to be expected when employing moisture-removing conditions to the contacting of a distilled dewaxed lubricating stock.

It can thus be concluded that it has been discovered that moisture removal from the adsorbent is directly correlated to reduction in neutralization value. In applying this discovery to the conventional contact filtration process it is seen that it is possible to substantially reduce the neutralization value, improve the color and reduce the emulsification tendency by a method which does not increase the ash content of the oils of a lubricating oil stock regardless of whether the neutralization value is caused by the presence of inorganic or organic acids, a process which heretofore has been deemed to be not economically feasible. The uniqueness of this discovery is further illustrated by the fact that both the use of steam and an inert desiccated, non-oxidizing gaseous medium such as nitrogen gave approximately the same color improvement indicating that the color removal properties of the clay are independent of the moisture content of these adsorbents. Furthermore the time element involved in the contacting operation is also critical. It has been demonstrated that the time of oil-clay contact necessary for substantially complete clarification and decolorization of the lubricating oil is not sufficient to effect maximum neutralization value reduction of said oil. A finite time dependent upon the amount of moisture, method of removal, type of equipment employed, etc., is required to remove the moisture and hence effect maximum neutralization number reduction, this time being independent of the time required for decolorization.

What is claimed is:

1. In a process for reducing the neutralization value of

TABLE V

*Contacting dewaxed bright stock with acid-treated clay—Variation in stripping rate*

| Run No. | Clay Rate, #/bbl. | Percent Moisture in Clay | Contact Temp., °F. | Contact Time, Min. | Stripping Medium | | Pressure | Charge Oil* | | Treated Oil | | Steam Emulsion Number** |
|---|---|---|---|---|---|---|---|---|---|---|---|---|
| | | | | | Type | Rate, cu. ft./bbl. | | Neut. Value | Color | Neut. Value | Color | |
| 1 | 10 | 23.3 | 510 | 35 | Methane | 25 | atm | 0.15 | 7+ | 0.09 | 4½+ | |
| 2 | 10 | 23.3 | 512 | 35 | do | 47 | atm | 0.15 | 7+ | 0.08 | 4½+ | 350 |
| 3 | 10 | 23.3 | 515 | 35 | do | 130 | atm | 0.15 | 7+ | 0.05 | 4½+ | 385 |
| 4 | 10 | 23.3 | 510 | 35 | None | | atm | 0.15 | 7+ | 0.14 | 4½+ | |
| 5 | 10 | 23.3 | 510 | 35 | do | | 15" vac | 0.15 | 7+ | 0.10 | 4½+ | 405 |
| 6 | 10 | 23.3 | 510 | 35 | do | | 24" vac | 0.15 | 7+ | 0.05 | 4½+ | |
| 7 | 10 | 23.3 | 515 | 35 | Methane | 65 | 10" vac | 0.15 | 7+ | 0.05 | 4½+ | |
| 8 | 10 | 23.3 | 515 | 35 | do | 18 | 15" vac | 0.15 | 7+ | 0.05 | 4½+ | 367 |

*S. E. No. 900.
**ASTM Designation: D157-51.

TABLE VI

*Contacting dewaxed neutral with natural clay—Variation in stripping medium*

| Run No. | Clay Rate, #/bbl. | Percent Moisture in Clay | Contact Temp., °F. | Contact Time, Min. | Stripping Medium | | Pressure | Charge Oil | | Treated Oil | |
|---|---|---|---|---|---|---|---|---|---|---|---|
| | | | | | Type | Rate | | Neut. Value | Color | Neut. Value | Color |
| 1 | 7 | 15.4 | 410 | 35 | Methane | 100 cu. ft./bbl. | atm | 0.15 | +2 | 0.04 | 1½+ |
| 2 | 7 | 15.4 | 405 | 35 | None | | atm | 0.15 | +2 | 0.13 | 1½+ |
| 3 | 7 | 15.4 | 400 | 35 | do | | 25" vac | 0.15 | +2 | 0.04 | 1½+ |

In practicing this invention the conventional type of contacting equipment can be employed when modified to permit the use of inert, desiccated gaseous stripping medium or subatmospheric pressure in the contacting vessel. The contacting may be carried out at temperatures between about 350° to 550° F. As in conventional decolorizing by contact filtration, the same economical clay dosages may be employed; viz., 3 pounds to 15 pounds of acid treated or natural clay per barrel of oil. However in some instances it may be required that larger amounts of clay be used. The time of contacting will depend upon the quantity of oil being treated and the efficiency of moisture removal but generally a 35 minute treat is sufficient where commercially available clays are used in the conventional contacting process.

a lubricating oil the step which comprises intimately contacting at a temperature of about 350°–550° F. an organic acid-containing lubricating oil with 3–15 pounds per barrel of oil of a hydrous alumino-silicate adsorbent from which substantially all of the bound water is removed without deleteriously effecting the structural water content of said adsorbent for a time sufficient to produce a substantial improvement in the neutralization value reduction of said oil, said contacting being conducted in the absence of air and steam, and maintained in an anhydrous condition by stripping during said contacting any moisture which is produced during said contacting.

2. In a process for reducing the neutralization value of an organic acid-containing lubricating oil stock which comprises admixing 3–15 pounds/barrel of oil of a hydrous alumino-silicate adsorbent to form an adsorbent-oil slurry, agitating said slurry in a contact zone at a temperature of about 350°–550° F. in the absence of air and steam for a time in excess of the time required to produce a maximum color improvement in said oil and sufficient to effect a further and maximum reduction in the neutralization value achieved in the time required to produce maximum color improvement, stripping from said zone during said agitating any moisture which is produced during said agitation whereby said zone is maintained substantially free of accumulated water, and filtering the treated oil and clay, said adsorbent during said agitating being substantially free of adsorbed water without deleteriously affecting the structural water content of said adsorbent.

3. A process in accordance with claim 2 in which said agitating is carried out in the presence of, and said stripping accomplished by, an inert gaseous stripping medium which is introduced at a rate sufficient to purge said zone of air, free said adsorbent from adsorbed water under the contacting conditions in said zone, and maintain said zone substantially free from accumulated water during said agitating.

4. A process in accordance with claim 3 in which said adsorbent has been pretreated prior to said admixing to remove substantially all of the adsorbed water therefrom without deleteriously affecting the structural water content of said adsorbent.

5. A process in accordance with claim 2 in which said stripping is accomplished by carrying out said agitating at a subatmospheric pressure sufficiently low to remove substantially all of the air from said zone, free said adsorbent from adsorbed water, and maintain said zone substantially free from accumulated moisture.

6. A process in accordance with claim 5 in which said adsorbent has been pretreated prior to said admixing to remove substantially all of the adsorbed water therefrom without deleteriously affecting the structural water content of said adsorbent.

7. A method for reducing the neutralization value of a lubricating oil stock which has been subjected to intimate contact with a hydrous alumino-silicate adsorbent to remove therefrom a substantial quantity of naturally occurring color bodies which comprises admixing with said oil 3–15 pounds per barrel of oil of a hydrous alumino-silicate adsorbent to form an adsorbent-oil slurry, agitating said slurry in a contacting zone at a temperature of about 350°–550° F. in the absence of air and steam for a time sufficient to effect a maximum reduction in neutralization value surpassing the reduction in neutralization value achieved in the treatment of said oil to remove therefrom a substantial quantity of naturally occurring color bodies, stripping from said zone during said agitating any moisture which is produced during said agitating whereby said zone is maintained substantially free of accumulated moisture, and filtering the treated slurry to separate the treated oil and clay, said adsorbent during the agitating being substantially free of adsorbed water without deleteriously affecting the structural water content of said adsorbent.

References Cited in the file of this patent

UNITED STATES PATENTS

| | | |
|---|---|---|
| 2,045,160 | Moorman et al. | June 23, 1946 |
| 2,563,369 | Reiley et al. | Aug. 7, 1951 |
| 2,572,433 | Bergstrom et al. | Oct. 23, 1951 |
| 2,585,491 | Olsen | Feb. 12, 1952 |
| 2,621,149 | Scott et al. | Dec. 9, 1952 |
| 2,651,602 | Davis et al. | Sept. 8, 1953 |
| 2,679,471 | Ayers et al. | May 25, 1954 |

OTHER REFERENCES

Mantell: Absorption, First Edition, McGraw-Hill Book Co., New York, N. Y., 1945, page 49.

Sachanen: The Chemical Constituents of Petroleum, Reinhold Publishing Corp., 330 W. 42nd Street, N. Y. (1945), page 320.